US011657598B1

(12) United States Patent
Suresh (10) Patent No.: US 11,657,598 B1
(45) Date of Patent: May 23, 2023

(54) COMPOSITE CAR IMAGE GENERATOR

(71) Applicant: Simple Intelligence, Inc., Jackson Township, NJ (US)

(72) Inventor: Rahul Suresh, Jackson Township, NJ (US)

(73) Assignee: SIMPLE INTELLIGENCE, INC., Jackson Township, NJ (US)

( * ) Notice: Subject to any disclaimer, the term of this patent is extended or adjusted under 35 U.S.C. 154(b) by 0 days.

(21) Appl. No.: 18/075,182

(22) Filed: Dec. 5, 2022

(51) Int. Cl.

| | |
|---|---|
| *G06V 10/772* | (2022.01) |
| *G06V 10/762* | (2022.01) |
| *G06V 20/70* | (2022.01) |
| *G06V 10/774* | (2022.01) |
| *G06V 10/82* | (2022.01) |
| *G06V 10/26* | (2022.01) |
| *G06F 16/951* | (2019.01) |

(52) U.S. Cl.
CPC .......... *G06V 10/772* (2022.01); *G06F 16/951* (2019.01); *G06V 10/26* (2022.01); *G06V 10/762* (2022.01); *G06V 10/774* (2022.01); *G06V 10/82* (2022.01); *G06V 20/70* (2022.01)

(58) Field of Classification Search
CPC .... G06V 10/772; G06V 20/70; G06V 10/762; G06V 10/82; G06V 10/26; G06V 10/774; G06F 16/951
See application file for complete search history.

(56) References Cited

U.S. PATENT DOCUMENTS

| | | | |
|---|---|---|---|
| 10,706,321 B1 * | 7/2020 | Chen | G06T 3/60 |
| 10,719,742 B2 | 7/2020 | Shechtman et al. | |
| 11,341,699 B1 * | 5/2022 | Gottlieb | G06N 20/00 |
| 2019/0354804 A1 * | 11/2019 | Ros Sanchez | G06F 18/2148 |
| 2022/0138250 A1 | 5/2022 | Wiesel et al. | |
| 2022/0358775 A1 * | 11/2022 | Hantehzadeh | G06V 10/774 |
| 2023/0004760 A1 * | 1/2023 | Mustikovela | G06V 20/56 |

OTHER PUBLICATIONS

Lu, Yongyi, et al. "Image generation from sketch constraint using contextual gan." Proceedings of the European conference on computer vision (ECCV). 2018. (Year: 2018).*

(Continued)

*Primary Examiner* — Utpal D Shah
(74) *Attorney, Agent, or Firm* — Trojan Law Officees (57) ABSTRACT

The present disclosure relates generally to artificial intelligence (AI), machine learning (ML), and deep learning technologies. More specifically, the disclosure relates to a vehicle image composite system that employs computer vision (CV) along with a Generative Adversarial Network (GAN) to generate realistic composite car images. For example, in one or more embodiments, the composite car image generator system trains a Convolutional Neural Network (CNN) to learn the Make Model Year parameters of all vehicle images provided. Once trained, the determined Make Model Year parameters of the vehicles allow the CNN to produce realistic composite images of a vehicle of any make, model, year, and trim level.

18 Claims, 5 Drawing Sheets
(5 of 5 Drawing Sheet(s) Filed in Color)

(56) References Cited

OTHER PUBLICATIONS

Radhakrishnan, Sreedhar, et al. "Creative intelligence-automating car design studio with generative adversarial networks (GAN)." Machine Learning and Knowledge Extraction: Second IFIP TC 5, TC 8/WG 8.4, 8.9, TC 12/WG 12.9 International Cross-Domain Conference, CD-MAKE 2018. (Year: 2018).*

Murza, Mehdi; Osindero, Simon; Conditional Generative Adversarial Nets; Technical Report; Nov. 6, 2014; arXiv:1411.1784v1.

Long, Jonathan; Shelhamer, Evan; Darrell Trevor; Fully Convolutional Networks for Semantic Segmentation; Technical Report; Mar. 8, 2015; arXiv:1411.4038v2.

Ronneberger, Olaf; Fischer, Philipp; Brox, Thomas; U-Net: Convolutional Networks for Biomedical Image Segmentation; Technical Report; May 18, 2015; arXiv:1505.04597v1.

Chen, Liang-Chieh et al.; Semantic Image Segmentation with Deep Convolutional Nets and Fully Connected CRFs: Technical Report; Jun. 7, 2016; arXiv:1412.7062v4.

Xu, Ning et al.; Deep Image Matting; Technical Report; Apr. 11, 2017; arXiv:1703.03872v3.

Chen, Liang-Chieh et al.; DeepLab: Semantic Image Segmentation with Deep Convolutional Nets, Atrous Convolution, and Fully Connected CRFs; Technical Report; May 12, 2017; arXiv:1606.00915v2.

Gupta, Vikas; Raman, Shanmuganathan; Automatic Trimap Generation for Image Matting; Technical Report; Jul. 4, 2017; arXiv:1707.00333v2.

Chen, Liang-Chieh et al.; Rethinking Atrous Convolution for Semantic Image Segmentation; Technical Report; Dec. 5, 2017; arXiv:1706.05587v3.

Chen, Liang-Chieh et al.; Encoder-Decoder with Atrous Separable Convolution for Semantic Image Segmentation; Technical Report; Aug. 22, 2018; arXiv:1802.02611v3.

Karras, Tero et al.; Analyzing and Improving the Image Quality of StyleGAN; Technical Report; Mar. 23, 2020; arXiv:1912.049582.

Wang, Xintao et al.; Towards Real-World Blind Face Restoration with Generative Facial Prior; Technical Report; Jun. 11, 2021; arXiv:2101.04061v2.

* cited by examiner

COMPOSITE CAR IMAGE GENERATOR

FIELD OF THE INVENTION

The present disclosure relates generally to artificial intelligence (AT), machine learning (ML), and deep learning technologies. More specifically, the disclosure relates to a vehicle image composite system that employs computer vision (CV) along with a Generative Adversarial Network (GAN) to generate realistic composite car images. For example, in one or more embodiments, the composite car image generator system trains a Convolutional Neural Network (CNN) to learn the Make Model Year parameters of all vehicle images provided. Once trained, the determined Make Model Year parameters of the vehicles allow the CNN to produce realistic composite images of a vehicle of any make, model, year, and trim level.

BACKGROUND

In the automotive industry, businesses such as car dealerships need high-quality and high-definition images of vehicles for use in promotional and advertising materials. Often, they spend hours searching for appropriate images via search engines. This method of vehicle image acquisition not only takes time, but also runs the risk of picking up licensed or copyrighted images and/or images containing Personally Identifiable Information (PII) such as license plates, which cannot be used for commercial purposes. Thus, businesses in the automotive industry must rely on the photography industry to obtain vehicle images to use during promotional and advertising activities.

However, taking actual photographs involves a lead-time and/or licensing costs. Depending on the time frame and quantity, these lead-times and costs could quickly add up to become bottlenecks and/or financial burdens. Some auto manufacturers offer online tools to configure a visual representation of certain car models that are already on the market. However, there is no guarantee that such tools encompass the desired specification. Furthermore, the images created by such configuration tools are often not realistic and do not show the vehicle from more than one angle. Therefore, the automotive industry is currently in need of a method for creating high-quality, high-definition composite car images of specific makes, models, years, and trim levels, from multiple angles, on demand, quickly, and at low cost.

The computer software program of the present disclosure provides a solution to this problem by employing CV algorithms in conjunction with ML and deep learning technologies to generate realistic, detailed, and completely new composite car images of specific makes, models, years, and trim levels. Most existing composite image creation systems only offer high level images because a high-definition composite, for example one which clearly shows a car logo, would take up too much CPU power and/or is not possible to produce with the algorithms and processes in place. For example, there are image composite systems that can combine a foreground object with a background object, but these systems merely place the foreground object on the background while considering spatial proportions, and only modify either object a small amount, if at all. There are systems that create new composite images out of a multitude of source images, for example the user generated image creator at craiyon.com. But systems like these produce images with considerable blurring and smearing around the edges, so cannot provide the clear, high-definition car images that automotive businesses require. Luckily for those businesses, however, the vehicle image composite system of the present disclosure has succeeded in creating high-definition composite images of vehicles through a specific and efficient combination of image gathering, clustering, filtering, compression, GAN, semantic segmentation, and deep matting.

SUMMARY

A composite car image generator system in one or more embodiments is comprised of a data gathering process utilizing web crawling technology, an image selection process utilizing a Generative Adversarial Network (GAN) architecture, followed by a process reducing the dimensions of output vectors by way of Principal Component Analysis (PCA) to minimize the processing power needed downstream, a process to cluster the selected output vectors, a process to estimate the image pose and filter according to pose via a ResNet (Residual Network) deep learning model, a process to remove background and noise images via the use of semantic segmentation algorithms combined with deep image matting, and finally the process to use GAN architecture again where a generator Convolutional Neural Network (CNN) generates composite car images that are realistic enough to pass internal checks by a discriminator Convolutional Neural Network (CNN).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION

Figure 1:
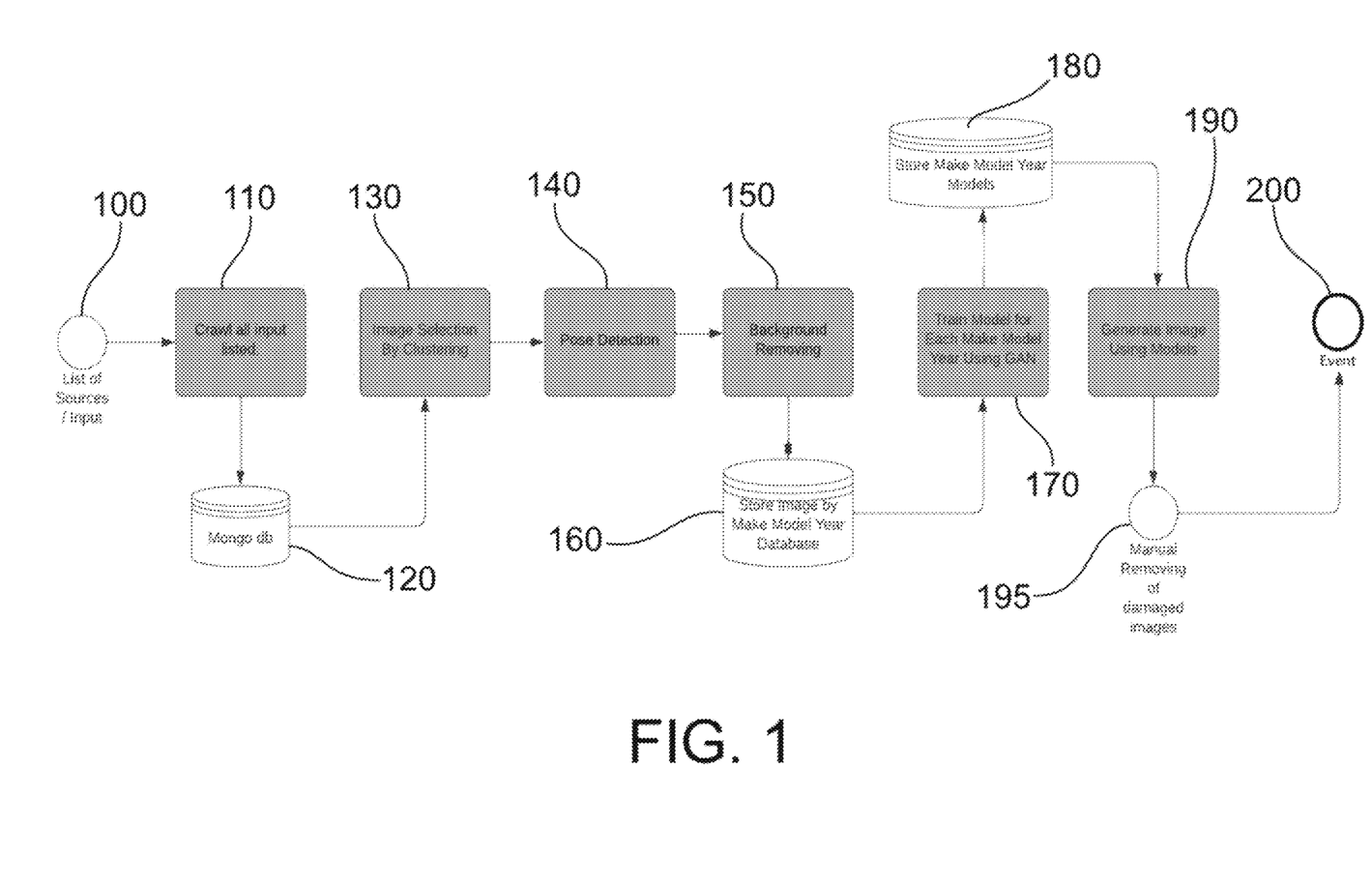
FIG. 1 is an overview of the software architecture and data pipeline.

Referring to FIG. 1, it is an overview of the software architecture and data pipeline. It starts with a list of car image sources 100. A web crawling process 110 is first implemented in which a web crawler views and collects online car images. The collected car images are stored in a car images database 120. These car images are then compressed (not pictured). From there, an image selection by clustering process 130 is implemented which clusters car images according to pose, initially done manually and later done by an adversarial neural network. This is followed by cleaning via a pose detection process 140 implemented by a residual network deep learning model which filters the car images by poses, and a background removal process 150 which is implemented by a semantic segmentation algorithm. The cleaned car images are then enhanced by an image matting algorithm (not pictured). The enhanced car images are stored in a Make Model Year database 160. From here, there is a Make Model Year Training process 170 which is implemented by a generative adversarial network in which models are trained to recognize Make Model Year parameters. The trained models are stored in a Make Model Year Models database 180. Finally, there is the composite car image generation process 190 which is implemented by a generator neural network using the models contained in the Make Model Year Models database 180. These composite car images will then be processed by an adversarial discrimination neural network (not pictured) that distinguishes realistic composite car images from non-realistic composite car images. Initially, there may be a Manual Removal of Damaged Images process 195. However, after many iterations, a production ready composite car image is generated 200.

The first step in the entire process is to gather data. High-quality vehicle images are acquired by deploying web crawlers to visit car dealer websites to scrape images. Large amounts of data are required to train ML models. The required data encompasses the make, model, year, and trim level of every vehicle manufactured. Scraping car images from dealership websites provides this required data.

For the product to automatically go to a dealership web site, browse each car listing, and find the information about each car, the website structure must be understood. All car dealerships in the U.S. are powered by different software providers that outsource the website development of dealership and each providers follow a list of templates. So, dividing the list of dealers among these software providers reveals the exact structure of the website. This knowledge enables the web crawlers to navigate all the pages of each dealer's website and easily download all the images for computer vision processing.

Figure 2:
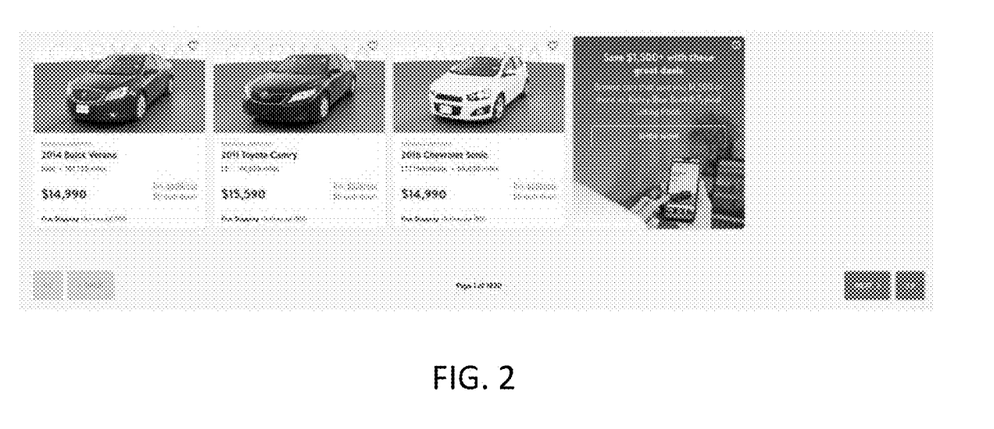
FIG. 2 illustrates the structure of a typical car dealership website from which the web crawling process will scrape sample images to train the GAN.
Figure 3:
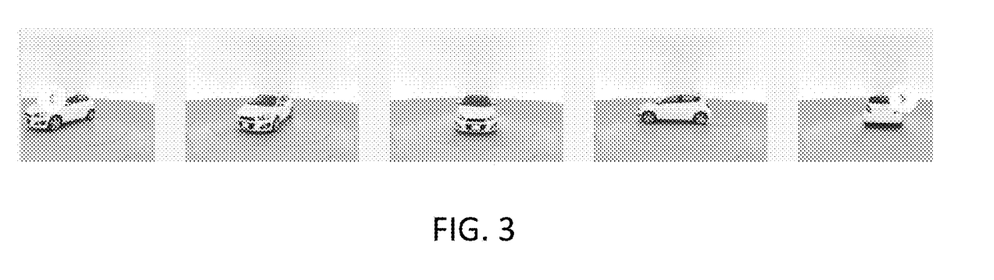
FIG. 3 illustrates the various poses that can typically be downloaded from a car dealership website.

Generally, web pages of dealership businesses have the structure as illustrated in FIG. 2 starting with the home page. There is usually a list of cars with an arrow showing the next page or the previous page. The Selenium library can be used to click on any D.O.M. object on the page just like a user would click on a browser automatically. Thus, each of the car listings can be clicked to get detailed information about the make, model, year, and trim of that car. Users can also download each angle for that particular make, model, year, and trim as shown in FIG. 3.

All these downloaded images would act as the training images for the present disclosure's ML model and CV algorithm. An illustrative list of dealer software providers are: 1. forddirect.com; 2. dealereprocess.com; 3. roadster.com; 4. carwizard.net; 5. dealerinspire.com; 6. 321ignition.com; and 7. gosokal.com.

Once the images to be used for training the product's ML models are thus collected, the system continues to the second step of image selection. The system uses generative adversarial networks (GANs), an approach to create deep learning models using CNNs. GAN architecture pits two CNNs against each other (hence the "adversarial") to "mimic" any distribution of data, and generate new, synthetic data points that could plausibly pass for real data. The GANs can easily get modal (or mode) collapse if fewer variant images are fed into the network, thus generating only a limited variety of data as output. To prevent this issue, the system passes all images to the VGG-16 pre-trained network, trained on all the vehicle images obtained from the web crawlers.

The final fully connected layer from the network is removed, and the final shape of the network output is (1×1×4096). The dimension of the output vector (1×1×4096) is reduced to (1×1×64) using Principal Component Analysis (PCA), a method to reduce the dimensionality of large datasets (by reducing the number of variables) while still retaining most of their information. Dimensionality reduction with PCA trades some accuracy for simplicity.

This reduction was made keeping in mind the trade-off between information stored in the compressed data and the processing power required when doing the clustering (next step). Thus, even though the reduction affects accuracy, the effect is not too large. And the resulting smaller dataset is easier to explore and visualize.

Figure 4:
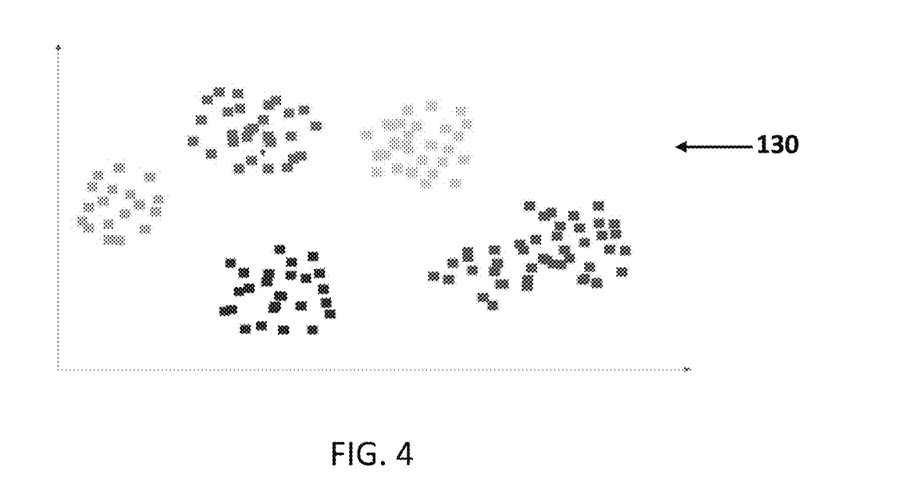
FIG. 4 illustrates the clustering of output vectors to be used in training the GAN.

FIG. 4 illustrates the next step, which is the clustering of the compressed output vectors to be used in training the GAN. For the input training data, images from different clusters are chosen, taking care not to choose too many images from the same cluster. These simple steps will help to get good variance in the dataset, which will further help in training the GAN. A network trained over a large dataset will be used in the transfer learning to get the individual model's images. The GAN will be trained with all the images that filtered out from the clustering step. Some of the raw images in the training dataset will contain "noise" but minor noises act as random noise and will further help to overcome the modal collapse issue.

Figure 5:
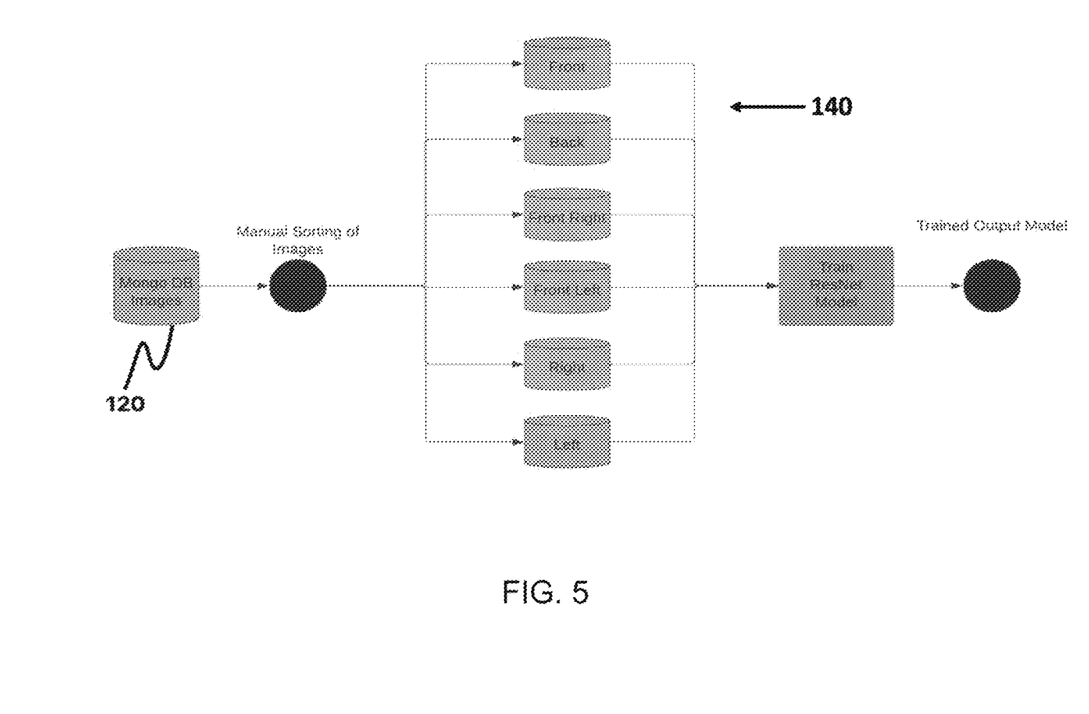
FIG. 5 illustrates the pose estimation, filtering, training, and model output process.

FIG. 5 illustrates the next steps of pose estimation, filtering, training, and the model output process. Pose estimation is crucial in some computer vision applications. It is required to predict and track the location and pose of an object based on a number of key points. In the present disclosure's case, the object is a car. As the application looks at numerous dealership websites, it will go through thousands of images of cars. The system needs to filter these images by pose. So, the system includes a trained ResNet (Residual Network) deep learning model to filter images by front, front right, front left, left, right and back poses. Models can be separated according to each of these poses. Each model is initially trained via manual separation and training of about 1,000 images. This initial manual classification and separation of poses reduces noise in the output. And once the training is complete, the CNN can classify the next 100 million images on its own.

Figure 6:
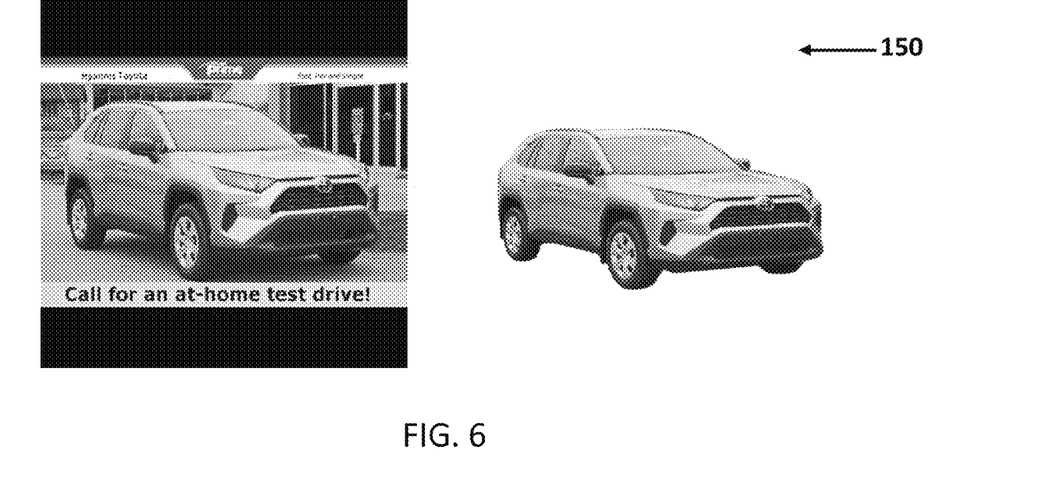
FIG. 6 illustrates a vehicle image before and after the background and noise removal process.

FIG. 6 illustrates a vehicle image before and after the background and noise removal process. The system removes the background area from the image. This is important because some images contain sensitive or proprietary information that users cannot simply assume as their own. The primary objective is to first generate a plain image of the vehicle based on its make and model. After the base image has been generated, any additional design can be further customized per the user's need. Also, removal of the background from input images speeds up the model training process significantly.

Before doing the style transfer, the system passes the raw input image to the pose estimation network. The Resnet-34 architecture is used for this purpose. This image classification model and CNN is pre-trained on the crawled car images. Unlike traditional neural networks, Resnet-34 takes residuals from each layer and uses them in the subsequent connected layers. This architecture choice works exceptionally well for the dataset of the present disclosure.

For background removal, out of all currently available semantic segmentation algorithms such as Unet, Fully Convolutional Network, and DeepLabv3+, as well as Mask R-CNN, an instance segmentation algorithm, DeepLabV3+ works best for the system of the present disclosure. That said, although DeepLabV3+ is a state-of-the-art algorithm for image segmentation, the resultant images will have fuzzy boundaries, making the overall quality unrealistic unless image matting is incorporated atop DeepLabV3+'s output. So for this, the present system uses Deep Image Matting.

Using the combination of DeepLabV3+ and Deep Image Matting will produce clearer boundaries in the output images. However, there will still be some noise and unnecessary artifacts in the final image. So to get rid of these elements, the output images will have to go through an image enhancement algorithm. The system of the present disclosure uses adopted GFPGAN for this purpose, which removes almost all noise present in the GAN output.

The next step is image segmentation. Image segmentation refers to partitioning an image into several disjoint subsets, such that each subset corresponds to a meaningful part of the image. By using image segmentation techniques, group-specific pixels can be divided from an image, they can be assigned with unique labels, and pixels can be further classified according to these labels. Most images have noise or unwanted regions. Image segmentation can help to generate important segments despite this noise.

Image segmentation is broadly divided into three categories: (1) Semantic segmentation; (2) Instance segmentation; and (3) Panoptic segmentation. Semantic segmentation assigns a class to every pixel based on the texture in the image. Instance segmentation can detect each object or instance of a class present in an image and assign a different mask or bounding box with a unique identifier. Finally, panoptic segmentation presents a unified image segmentation approach where each pixel in a scene is assigned a semantic label (due to semantic segmentation) as well as a unique instance identifier (due to instance segmentation).

Deep Convolutional Neural Networks and DeepLab Semantic Segmentation

Deep Convolutional Neural Networks (DCNNs) have shown state-of-art performance in high-level vision tasks, such as image classification and object detection. The network is constructed with standard convolution and pooling operations which make the output feature map smaller after each block operation. The responses at the final layer of DCNNs are not sufficiently localized for accurate object segmentation. This is due to the very invariance properties that make DCNNs good for high-level tasks.

DeepLab is a semantic segmentation architecture or model that is open-sourced by Google. Semantic segmentation is vital in computer vision since it segments images by understanding them at pixel level—which is a game-changing capability with dozens of real-world applications including autonomous driving, image search engines, and augmented reality.

DeepLab introduces the Atrous convolution layer to adjust/control the effective field-of-view of the convolution. It uses a parameter called 'atrous/dilation rate' that adjusts the field-of-view. This is a simple yet powerful technique to make the field-of-view of filters larger without impacting computation or the number of parameters.

DeepLab is a series of four algorithms, DeepLabv1, DeepLabv2, DeepLabv3, and the latest release is DeepLabV3+ which the system of the present disclosure uses in its pipeline. The network uses an encoder and a decoder. The encoder module encodes multi-scale contextual information by applying atrous convolution at multiple scales, while the simple yet effective decoder module refines the segmentation results along object boundaries. The system of the present disclosure uses the Xception-65 backbone with an output stride of 8.

Image Matting to Improve Image Accuracy

Image Matting is a technique for image and video editing and composition. It involves estimating the foreground object in images and videos with the highest possible accuracy. Image matting is a very important technique, particularly in film production for editing and for creating visual effects.

During image segmentation, the image is segmented into foreground and background by labeling the pixels. This generates a binary image, wherein each pixel either belongs to the foreground or the background, but not to both. Image matting however results in partial or mixed pixels, that is, the pixels may belong to both the foreground and the background.

Image matting can be represented by the following equation: $C(p)=a(p)F(p)+(1-a(p))B(p)$ where, $C$: observed image; $F$: foreground image; $B$: background image; $p=(x, y)$: image coordinates; $a(p)$: the pixels' foreground opacities.

For the image matting equation, if the alpha matte($\alpha p$) is constrained to $(0,1)$, it represents an image matting or compositing problem. But if the value is 0 or 1, this equation will simplify to a typical image segmentation problem, where each pixel belongs to either the foreground or the background.

Deep Image Matting

Given the input image and its trimap, deep image matting directly computes alpha matte using the deep learning technique. Previous image matting algorithms approach this as a color problem, which makes them incredibly sensitive to situations where the foreground and background color distributions overlap. Unfortunately, this is a common case for these methods and natural images, often leading to low-frequency "smearing" or high-frequency "chunky" artifacts, depending on the method. Instead of relying primarily on color information, the network can learn the natural structure that is present in alpha mattes. Deep Image Matting researchers have produced a custom dataset of 49,300 images specifically for image matting.

The network architecture is divided into two parts. The first consists of an encoder-decoder architecture. It takes an image patch and a trimap as input and is penalized by the alpha prediction loss and a novel compositional loss. The alpha-prediction loss is the absolute difference between the ground truth alpha values and the predicted alpha values at each pixel. The compositional loss is the absolute difference between the ground truth RGB colors and the predicted RGB colors composited by the ground truth foreground, the ground truth background, and the predicted alpha matte. The second network is a small fully convolutional network that refines the alpha prediction from the first network with more accurate alpha values and sharper edges. They also use two losses: the alpha-prediction loss and the compositional loss. The overall loss is the weighted summation of the two individual losses with equal weights given to each individual loss.

The model training happens in three phases. In the first stage, the training of the encoder-decoder network is performed using overall loss. In the second stage, only the refinement part of the network is trained with alpha prediction loss. And in the third stage, both the encoder-decoder architecture and the refinement part from the first and second training stage are taken. Then their combined architecture is fine-tuned together using alpha prediction loss. In the system of the present disclosure, a similar architecture and training procedure were adopted, which helped achieve high performance.

Figure 7:
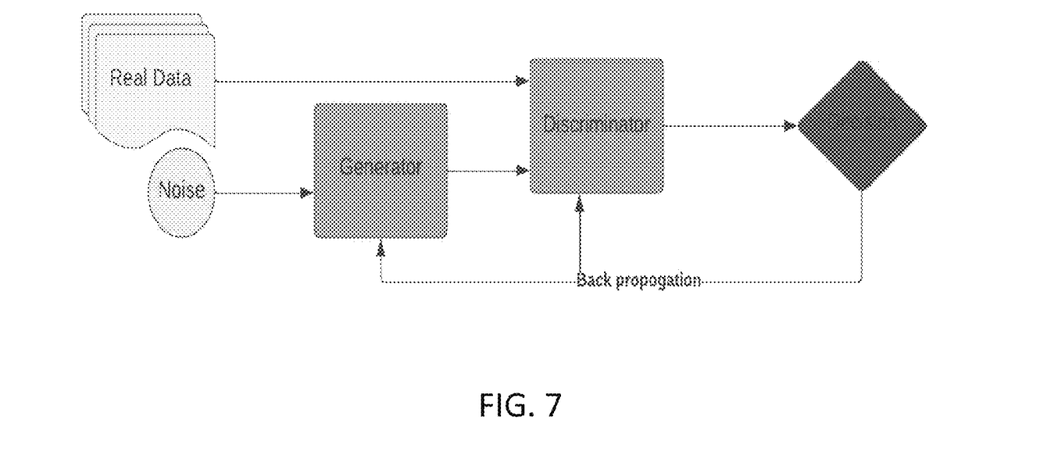
FIG. 7 illustrates an example generative adversarial network that includes a generator neural network and an adversarial discriminator neural network.

FIG. 7 illustrates the iterative process used by an example Generative Adversarial Network (GAN). During development of the system of the present disclosure, multiple GAN architectures were tried including conditional GAN to generate images based on the make-model-years info provided. However, the output quality was insufficient even when training with 3-4 classes. In addition, a significant amount of time was consumed for training each model. To overcome these challenges, the system ultimately adopted the use of StyleGAN2, a GAN that replaces adaptive instance normalization with weight demodulation and introduces an improved training scheme and new types of regularization.

A Generative Adversarial Network or simply GAN is known for creating a new data instance that resembles the training data. GAN networks mainly consist of two components: the generator or the generative model and the discriminator or the discriminative model. The generator portion of the GAN captures the data distribution and generates the image, while the discriminator portion distinguishes different data instances. The discriminative model also estimates the probability that a sample came from the training data rather than from the generative model.

Latent space refers to an abstract multi-dimensional space containing feature values that cannot be interpreted directly, but which encode a meaningful internal representation of externally observed events. In layman's terms, latent space represents compressed data. In the case of GANs, the generative model applies meaning to points in a chosen latent space, such that new points drawn from the latent space can be provided to the generator model as input and used to generate new and different output examples.

GANs face several issues such as model parameter oscillation, unstable training, vanishing gradients, and convergence difficulties. Sometimes the generator collapses and starts producing a limited sample type—an effect called mode collapse. To evaluate the quality of generated images, GAN uses the Frechet Inception Distance (FID) score, a metric to calculate the distance between feature vectors calculated for real and generated images.

GAN is defined as a minimal maximal game with the following objective function:

$$\min_G \max_D V(D, G)$$
$$V(D, G) = \mathbb{E}_{x \sim p_{data}(x)}[\log D(x)] + \mathbb{E}_{z \sim p_z(z)}[\log(1 - D(G(z)))]$$

where, G: Generator; D: Discriminator; E: Expected value; Pdata(x): distribution of real data; P(z): distribution of generator; x: sample from Pdata(x); z=sample from P(z); D(x)=Discriminator network; G(z)=Generator network.

Several works have been done by utilizing the GAN concept. A few popular ones are Conditional Generative Adversarial Nets which generate images based on the class provided, Analyzing and Improving the Image Quality of StyleGAN2 which is state of art GAN network at the time of writing.

StyleGAN2

StyleGAN2 is a state-of-the-art GAN algorithm. This algorithm achieves highly accurate results by adopting multiple steps. It takes the input vector obtained from Gaussian distribution in most cases and passes it to a mapping network which is a stack of some neural network layers. This network increases the input vector resemblance to the latent distribution of the real images. StyleGAN2 uses a style-based generator that applies the mapped input vector separately to each style block. This ensures that the role of the input vector does not diminish as it goes through deep layers. StyleGAN2 uses path length regularization which allows StyleGAN2 to achieve the same displacement in image space as done in the input space. The architecture uses a similar concept to ResNet.

Figure 8A:
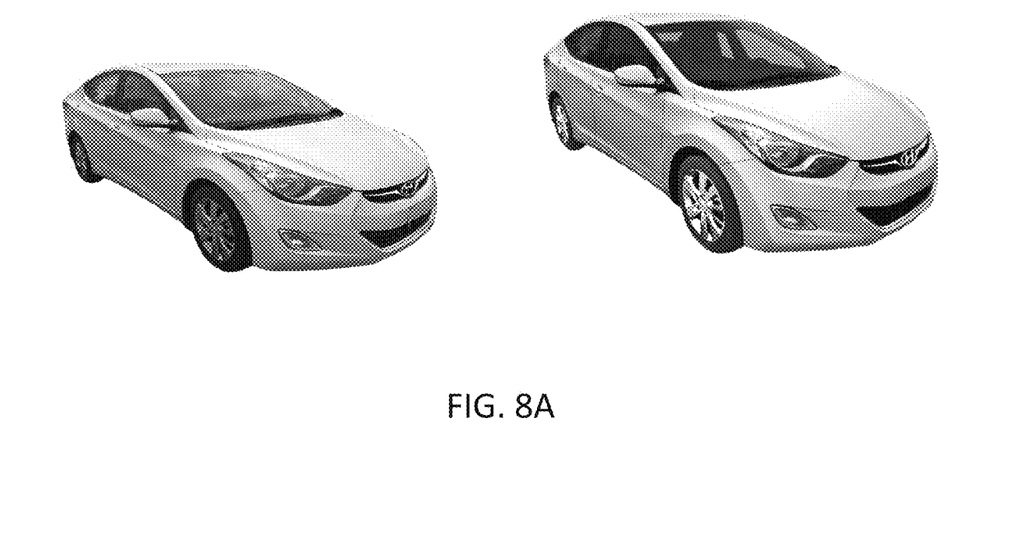
FIG. 8A-8B illustrate images before and after image enhancement.
Figure 8B:
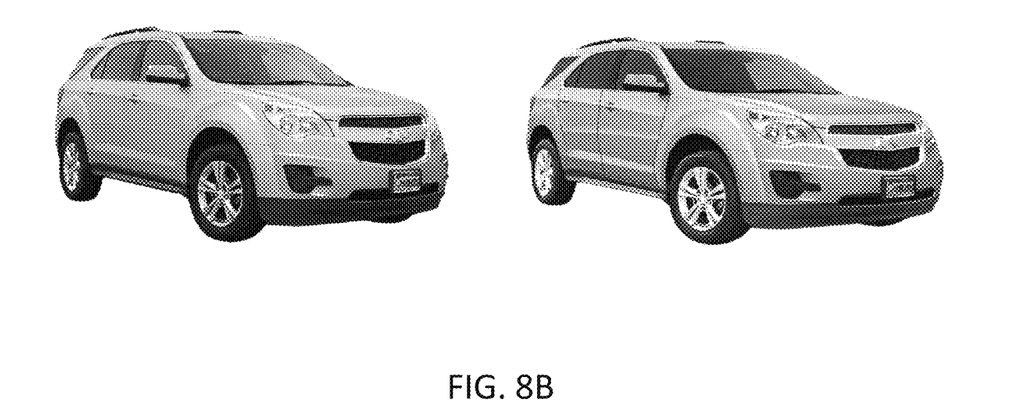

FIG. 8A-8B illustrate images before and after image enhancement. An image processing technique that improves clarity, sharpness, and details of the image feature thereby producing a more suitable, informative output image than the original. For image enhancements, the system of the present disclosure uses a deep learning-based algorithm GFP-GAN directly. It consists of a GAN combined with Generative Facial Prior (GFP), a tool specifically designed for image restoration.

During development, after the final image enhancement, vehicle logos did not display properly on some models. This happened because the GAN was unable to produce small objects—like logos—properly. To get around the issue, the original logo in the image was replaced with a HD image of the logo. Here, the challenge was that the HD image must properly overlap with the generated vehicle's image logo. For this, an architecture similar to the Faceswap algorithm was built, where given the source and destination image, the algorithm aligns the features present in the source image to overlap with the destination image. In the system of the present disclosure's architecture, the model was trained logo-wise, i.e., first images of the Toyota logo HD image were taken and then the images of the GAN output with the logo portion cropped out.

In the output of the trained model, the HD image of the logo was expected to align with the GAN logo cropped image so that it could be further overlapped with the GAN's image output. However, along with alignment, some features of the logo's HD image had changed. In addition, when overlapping the aligned HD image onto the GAN-generated image logo, the overall image of the vehicle looked as if it was poorly photoshopped.

Because the Faceswap technique did not work properly, another technique was adopted for this task. A key-point detector model was trained to detect the four corners or key points on the periphery of the car logo. Then a front HD image of the logo was taken and points were manually labeled on these four corners. Finally, the affine transformation was applied, using OpenCV to preserve collinearity and distance ratios. This method works well for almost every model generated with the system of the present disclosure.

What is claimed is:
1. A system for generating realistic composite car images, the system comprising:
   a web crawler to view and collect online car images;
   a memory comprising:
      a list of car image sources;
      a collected car images database;
      an adversarial neural network that selects and clusters the collected car images;
      a residual network deep learning model that filters car images by poses;
      a semantic segmentation algorithm that removes background images from car images;
      an image matting algorithm that enhances the clarity of the car images;

a Make Model Year database to store car images by make, model, and year;

a generative adversarial network to train Make Model Year Models based on car images in the Make Model Year database;

a Make Model Year Models database to store trained models;

a generator neural network that generates composite car images using the trained Make Model Year Models; and an adversarial discrimination neural network that distinguishes realistic composite car images from non-realistic composite car images;

at least one processor; and at least one non-transitory computer-readable storage medium storing instructions that when executed by the at least one processor, cause the system to:

activate the web crawler to collect car images from locations recited in the list of car image sources;

stores collected car images in the car images database;

compress the car images in the car images database;

activate the adversarial neural network to implement the car images selection and clustering process;

activate the residual network deep learning model to filter the car images by poses;

activate the semantic segmentation algorithm to remove background images from the filtered car images;

use the image matting algorithm to enhance the clarity of the car images;

store the enhanced car images in the Make Model Year database;

activate the generative adversarial network to train Make Model Year Models using Make Model Year parameters obtained from the car images in the Make Model Year database;

store the trained vehicle models in the Make Model Year Models database;

activate the generator neural network to generate composite car images using the models contained in the Make Model Year Models database;

feed the generated composite car image to the adversarial discrimination neural network to determine if the generated composite car image resembles a realistic car image; and train the generator neural network to generate updated Make Model Year parameters based on the determination of the adversarial discrimination neural network.

2. The system of claim 1, further comprising instructions that, when executed by the at least one processor, cause the system to train the generator neural network by propagating back the determination of the adversarial discrimination neural network to the generator neural network when the generated composite image is determined to not resemble a realistic image.

3. The system of claim 2, further comprising instructions that, when executed by the at least one processor, cause the system to train the adversarial discrimination neural network by propagating back the determination of the adversarial discrimination neural network to the adversarial discrimination neural network when the generated composite image is determined to resemble a realistic image.

4. The system of claim 1, further comprising instructions that, when executed by the at least one processor, cause the system to train the adversarial discrimination neural network based on a plurality of real training images comprising real images of vehicles in different poses, and with different makes, models, years, and trim levels.

5. The system of claim 4, wherein the instructions further cause the system to train the generator neural network using unsupervised data comprising the composite image and the plurality of training images.

6. The system of claim 1, further comprising instructions that, when executed by the at least one processor, cause the system to iteratively generate updated Make Model Year parameters to improve the Make Model Year parameters of the composite car image.

7. A method for generating realistic composite car images, the method comprising:

activating a web crawler to collect car images from locations recited in a list of car image sources;

storing the collected car images in a car images database;

compressing the car images in the car images database;

activating an adversarial neural network to implement a car images selection and clustering process;

activating a residual network deep learning model to filter the car images by poses;

activating a semantic segmentation algorithm to remove background images from the filtered car images;

using an image matting algorithm to enhance the clarity of the car images;

storing the enhanced car images in a Make Model Year database;

activating a generative adversarial network to train Make Model Year Models using Make Model Year parameters obtained from the car images in the Make Model Year database;

storing the trained vehicle models in a Make Model Year Models database;

activating a generator neural network to generate composite car images using the models contained in the Make Model Year Models database;

feeding the generated composite car image to an adversarial discrimination neural network to determine if the generated composite car image resembles a realistic car image; and training the generator neural network to generate updated Make Model Year parameters based on the determination of the adversarial discrimination neural network.

8. The method of claim 7, further comprising training the generator neural network by propagating back the determination of the adversarial discrimination neural network to the generator neural network when the generated composite image is determined to not resemble a realistic image.

9. The method of claim 8, further comprising training of the adversarial discrimination neural network by propagating back the determination of the adversarial discrimination neural network to the adversarial discrimination neural network when the generated composite image is determined to resemble a realistic image.

10. The method of claim 7, further comprising training the adversarial discrimination neural network based on a plurality of real training images comprising real images of vehicles in different poses, and with different makes, models, years, and trim levels.

11. The method of claim 10, further comprising training the generator neural network using unsupervised data comprising the composite image and the plurality of training images.

12. The method of claim 7, further comprising iteratively generating updated Make Model Year parameters to improve the Make Model Year parameters of the composite car image.

13. A display screen displaying a composite car image,
the composite car image comprises a detailed and new composite car image of specific makes, models, years, and trim levels of a vehicle;
wherein the logo of the vehicle in the composite car image is replaced by a high definition (HD) image of an original logo of the vehicle;
the composite car image obtained by a process comprising the steps of:
- activating a web crawler to collect car images from locations recited in a list of car image sources;
- storing the collected car images in a car images database;
- compressing the car images in the car images database;
- activating an adversarial neural network to implement a car images selection and clustering process;
- activating a residual network deep learning model to filter the car images by poses;
- activating a semantic segmentation algorithm to remove background images from the filtered car images;
- using an image matting algorithm to enhance the clarity of the car images;
- storing the enhanced car images in a Make Model Year database;
- activating a generative adversarial network to train Make Model Year Models using the Make Model Year parameters obtained from car images in the Make Model Year database;
- storing the trained vehicle models in a Make Model Year Models database;
- activating a generator neural network to generate composite car images using the models contained in the Make Model Year Models database;
- feeding the generated composite car image to an adversarial discrimination neural network to determine if the generated composite car image resembles a realistic car image; and
- training the generator neural network to generate updated Make Model Year parameters based on the determination of the adversarial discrimination neural network.

14. The display screen of claim 13, further comprises that the composite image is obtained by a further step of training the generator neural network by propagating back the determination of the adversarial discrimination neural network to the generator neural network when the generated composite image is determined to not resemble a realistic image.

15. The display screen of claim 14, further comprises that the composite image is obtained by a further step of training of the adversarial discrimination neural network by propagating back the determination of the adversarial discrimination neural network to the adversarial discrimination neural network when the generated composite image is determined to resemble a realistic image.

16. The display screen of claim 13, further comprises that the composite image is obtained by a further step of training the adversarial discrimination neural network based on a plurality of real training images comprising real images of vehicles in different poses, and with different makes, models, years, and trim levels.

17. The display screen of claim 16, further comprises that the composite image is obtained by a further step of training the vehicle generator neural network using unsupervised data comprising the composite image and the plurality of training images.

18. The display screen of claim 13, further comprises that the composite image is obtained by a further step of iteratively generating updated Make Model Year parameters to improve the Make Model Year parameters of the composite car image.

* * * * *